United States Patent Office 3,657,419
Patented Apr. 18, 1972

3,657,419
ANTIAMOEBIN, AN ANTHELMINTIC AND ANTI-
PROTOZOAL ANTIBIOTIC, AND A METHOD FOR
PRODUCING THE SAME
Mandayam Jeersannidhi Thirumalachar, Hindustan Anti-
biotics Ltd., Pimpri, Poona 18, India
Continuation-in-part of application Ser. No. 573,705, Aug.
19, 1966, which is a continuation-in-part of application
Ser. No. 491,159, Sept. 29, 1965. This application Mar.
5, 1968, Ser. No. 710,637
Int. Cl. A61k 21/00
U.S. Cl. 424—119          8 Claims

ABSTRACT OF THE DISCLOSURE

An anthelmintic and antiprotozoal antibiotic designated "Antiamoebin" is disclosed which is produced by cultivating at least one micro-organism taken from the group consisting of Emericellopsis synnematicola (ATCC 16540), E. poonensis (ATCC 16411), and Cephalosporium pimprina (ATCC 16541) in a broth culture medium containing carbohydrates, nitrogen and inorganic salts.

---

The present invention relates to a new anthelmintic and antiprotozoal antibiotic which has been designated "Antiamoebin" and will be hereinafter referred to by this name, and to a process for its production.

The present application is a continuation-in-part of my application Ser. No. 573,705, filed Aug. 19, 1966, now abandoned, which is in turn a continuation-in-part of my application Ser. No. 491,159, filed Sept. 29, 1965, now abandoned.

Antibiotics are biological products which are widely used not only in the treatment and control of human, animal and plant diseases but also as an active ingredient in disinfectant and antiseptic solutions. Some antibiotics have wide spectrum activity against a range of bacteria and other pathogenic micro-organisms, while others are specific against only a few bacterial pathogens. Antibiotics are used in the preservation of food, meat and milk preparations and in the sterilization of drinking water.

Antiamoebin, the product of the present invention, has been found to be an active antibiotic in that it is both antiprotozoal and anthelmintic. It is useful in any of the above applications. Solutions of Antiamoebin with or without other chemical antiseptics may be used for the disinfection of hospital floors, premises, utensils, furniture, instruments, etc. Infected clothing can be dipped and disinfected using an Antiamoebin solution. Though most of the known antibiotic solutions are antibacterial and have little activity against protozoa and helminth larvae which may be harbored in and around hospitals, human dwellings, schools, etc., Antiamoebin has been found very effective against these larvae. Some protozoa and helminth contamination occurs in food and water, and many parasitic diseases occur due to active larval penetration of the human skin. Antiamoebin has been found quite effective in these fields also.

In the course of a general program for developing new antiprotozoal and antihelmintic antibiotics at the Research Laboratories in Hindustan Antibiotics Research Centre, Pimpri, Poona, three new species of fungi have been discovered from which can be produced a new antibiotic, called Antiamoebin, by conventional fermentation procedures. These new strains are Emericellopsis synnetmaticola, Mathur and Thirumulachar, strain SLA II, a culture of which is deposited in the American Type Culture Collection, Rockville, Md., under the accession number 16540; Emericellopsis poonensis Thirumalachar, strain SLA I, a culture of which is deposited in the American type Culture Collection under the accession number 16411; and Cephalosporium pimprina Thirumalachar, strain SLA III, a culture of which is deposited in the American Type Culture Collection under the accession number 16541. Small quantities of this new antibiotic have also been found to produce by known strains of Emericellopsis humicola (Cain) Cain (=E. humicola (Cain) Gilman) and E. minima Stolk. It is well known that Emericellopsis is the perfect stage of the imperfect genus Cephalosporium. An account of the fungus E. synnematicola Mathur and Thirumalachar, has been published in Mycologia, vol. 52 pages 694–697, 1960. E. poonensis differs from E. synnematicola in producing Cephalosporium stage for its conidia unlike the Stilbum type of conidiophores in E. synnematicola. The sizes of the spores are also slightly different. Cephalosporium pimprina Thirum. belongs to the Curtipes group of Cephalosporium described by Sukapure and Thirumalachar (Mycologia, May-June issue, 1966). It does not produce the perithecial stage and the colonies are white and spreading. The conidiophores measure 20–30$\mu$ and the conidia measure 8–10 x 4–6$\mu$, and are ovate-ellipsoid, hyaline and smooth.

With respect to the novel process hereof, this invention comprises fermentative process of growing one of the three species of fungi mentioned above, and also selected strains of E. humicola and E. minima, in a culture medium containing assimilable sources of carbohydrate and nitrogen as well as inorganic salts. However, for economy of production, maximum yield of the antibiotic, and ease of recovery of certain cultural media are preferable. The presently preferred sources of carbohydrate in the culture medium are, for example, glucose, sucrose and starch. Other sources which may be included are dextrine, molasses, lactose, etc. The nitrogen sources that may be used are corn-steep, soybean and peanut meal, various legumes, distillers, solubles, casein and amino-acid mixtures, peptones (both meat and soy) and the like. Inorganic nitrogen sources include nitrate salts and ammonium salts. The nutrient inorganic salts to be incorporated in the medium include the customary salts capable of yielding ions of sodium, potassium, calcium, phosphate, chloride, sulphate and the like.

The essential trace elements which stimulate the growth of the fungus giving higher yields are also desirably incorporated in the culture medium. Such trace elements often form a part of the raw materials occurring as impurities.

For describing the processes involved in the production of Antiamoebin, the handling of the strain of Emericellopsis poonensis is described, and the same results may be obtained with the other species and strains mentioned previously. E. poonensis strain SLA-I can be grown on agar containing various nutrients at temperatures about 24 to 37° C., the optimum temperature being 28° C. Potato-dextrose agar, Sabouraud's agar, glucose-peptone agar, Czepeks agar are all suitable. The fungus grows as a white colony, developing aerial mycelium, and a large number of spherical conidial masses borne on conidiophore, typical of Cephalosporium. After incubation for about 10 to 15 days, black dots appear scattered over the colony. These are the ascigerous stage or the perfect stage of the fungus which conforms to the Emericellopsis stage. For production of the antibiotic, colonies 6 to 8 days old, bearing numerous conidial masses are suitable.

For preparation of limited amounts of the antibiotic, shake flasks and surface cultures in bottles can be employed. For large scale production stainless steel fermentors with aeration and agitation, temperature control and facilities for maintaining sterile conditions are employed. The preferred method of production is to grow the vegatative inoculum of the fungus in a seed vessel by inoculating it with a pure culture, using conidia, ascospores, mycelia, or a combination of these. When the vegetative growth has taken place with young and actively growing mycelium and inoculum is transferred aseptically to large tanks. The medium in which vegetative inoculum is developed can be same or different medium as that employed for the production of the antibiotic.

As is customary in producing antibiotics by submerged culture process, sterile air is blown through the culture medium, which is dispersed by agitation. The volume of air passed varies from 0.1 volume to 1 volume per minute per volume of culture broth. The initial pH of the medium can be from 4 to 7.5, though the preferred pH is 6.5, and the temperature of 20 to 37° C. is employed. Fermentation is carried for 72 to 120 hours, and at the end of fermentation the pH increases to the alkaline side. The recovery of the antibiotic follows by periodically harvesting a known quantity of the broth, and adding half volume of n-butanol, agitating thoroughly for extraction, separating the butanol by centrifuging, and evaporating the butanol under vacuum. The residue is re-extracted with methanol, and filtered. The solution is evaporated to dryness, and the quantity of antibiotic remaining is estimated. This gravimetric process gives satisfactory results and affords yields of 85 to 90 percent of the quantity of the antibiotic in the broth. In general, maximum production of the antibiotic after the inoculation of the culture medium takes place in about 2 to 8 days when submerged growth is employed and 8 to 15 days when surface culture is carried out.

The antibiotic produced in this invention can, as just indicated, be recovered from the culture medium by extractive and absorptive techniques. The former are preferred for commercial production, since the quantity recovered and the efficiencies are higher. For extraction of the antibiotic compound from the broth filtrate, water immiscible, polar organic solvents are preferred and for extracting from mycelium, aliphatic alcohols like methanol, ethanol, butanol, propanol, isopropanol, methyl and ethyl Cellosolve, aqueous acetone, etc. can be used. The preferred method of extraction is filtration of the broth and extraction of the filtrate and the mycelium separately. From the mycelium the antibiotic may be extracted in all the lower alcohols, such as methanol and ethanol, isopropanol, aqueous acetone, methyl Cellosolve, pyridine, dimethyl formamide, methyl and ethyl Cellosolve and others.

The antibiotic recovered in the organic solvent can be evaporated to dryness in vacuo, to yield the antibiotic in crude form. Alternatively, the antibiotic may be absorbed, using activated charcoal, magnesium aluminum silicate and the like. Elution of the antibiotic is only partial by organic solvents in which the antibiotic is soluble.

When, as is preferred, an extraction process is employed alone, the broth is filtered, and the filtrate is extracted with one third volume of n-butanol. The butanol is separated, and concentrated in vacuo to one-twentieth its original volume, and the antibiotic is precipitated by using a miscible solvent like acetone, or a mixture of miscible solvent like acetone and petroleum ether. The crude antibiotic is recovered for further purification. The mycelium may be extracted twice with n-butanol and the same process described for the filtrate may be carried out. The preferred process, however, is extraction of the mycelium in methanol or ethanol, followed by filtration. The methanolic or ethanolic extract is treated with decoloring carbon, and evaporated, until the alcohol is removed. The antibiotic is usually left behind as a white slurry mostly in a crystalline condition. The crude crystals are taken out by filtration and recrystallized for further purification.

For purification of the crude or partially purified Antiamoebin, the material is dissolved in 30 to 45% warm ethanol or methanol, treated with decoloring activated charcoal, filtered while it is still warm, cooled at room temperature and kept for 4 to 6 hours, and then transferred to a cold room at 5° C. overnight. Large masses of silky needle-shaped crystals white in mass, are thrown out, which are filtered, washed with water thoroughly and dried.

In reasonably pure form, the antibiotic Antiamoebin has the following characteristics:

Nature: Neutral polypeptide.

Form and color: White fasciculate needles, slightly bitter and odorless. Colorless in solution (1%) in methanol or ethanol.

Melting point: Two crystalline forms exist; one having a melting point of 192–195° C. when crystallized from methanol acetone and the other having a melting point of 218–220° C. when crystallized from aqueous methanol. The two forms are interconvertible.

pH: A 2% suspension in water has pH 5.0–7.0.

Optical activity: Dextro rotatory, $[\alpha]_D^{25}$ +10 (C., 1.02% in methanol).

$[\alpha]_D^{25}$ +10 (C., 1.03% in DMF).

U.V. absorption maxima: End absorption.

I.R.: 3320–3290 (bonded NH). 1650, 1530 (CO and NH deformation), 1078, 695 cm.$^{-1}$.

Solubility: Soluble in methanol, ethanol, butanol, n-propanol, isopropanol, pyridine, glacial acetic acid, dimethyl formamide, aqueous acetone, moist methyl-ethyl ketone and methyl and ethyl Cellosolve. Insoluble in water, chloroform, ether, petroleum ether, ethyl acetate, butyl acetate, acetone, toluene, carbontetrachloride, dioxane, benzene, carbon-disulphide, toluene, methyl chloride and ethylene glycol.

Nature: Neutral polypeptide.

Other Reactions: Negative Fehling's ferric chloride, Benedict's, Molisch's, Sakaguchi, ninhydrin, biuret and anthrone tests. Positive xanthoprotein test. Alkaline hydrolysis for one hour gives positive biuret test. Hydrolysis with 6 N HCl in a sealed tube for 16 hours gives eleven ninhydrin positive spots on two dimensional paper chromatography. The following amino acids are identified by one or two dimensional paper chromatography with the help of standard amino acids. Proline, α-amino isobutyric acid, Phenylalanine, valine, leucine, hydroxyproline, lysine and glutamic acid. Analysis, C, 56.11, H, 7.56, N, 13.56%. Assignee's test for halogen and sulphur is negative.

The UV and IR spectra of Antiamoebin in Nujol are given in the accompanying drawings, wherein.

EXAMPLE 1

Preparation of Antiamoebin

Figure 2:
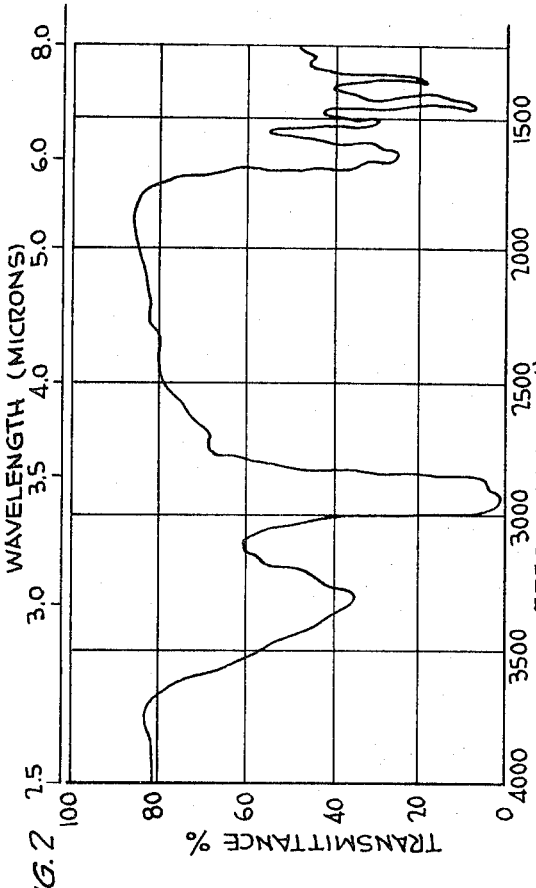
FIGS. 2 and 3 illustrate the IR spectra for two different regions.
Figure 3:
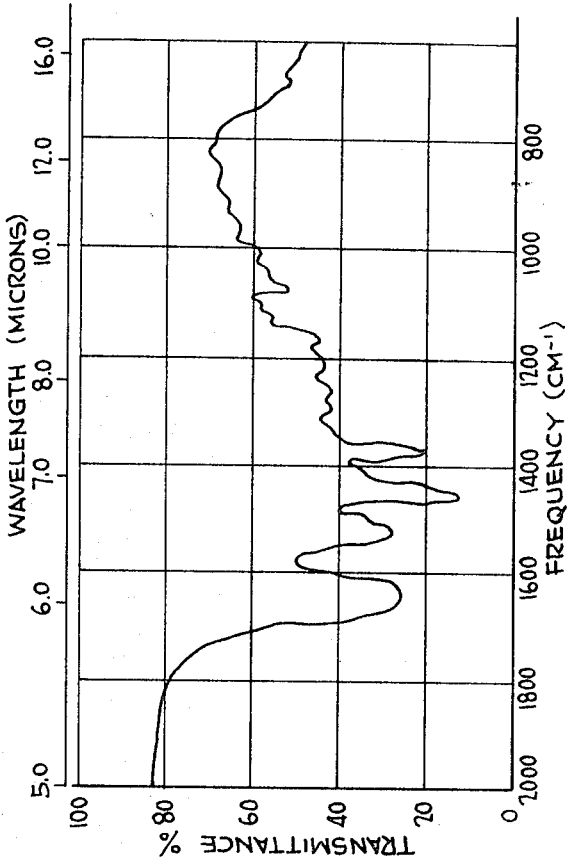
Figure 1:
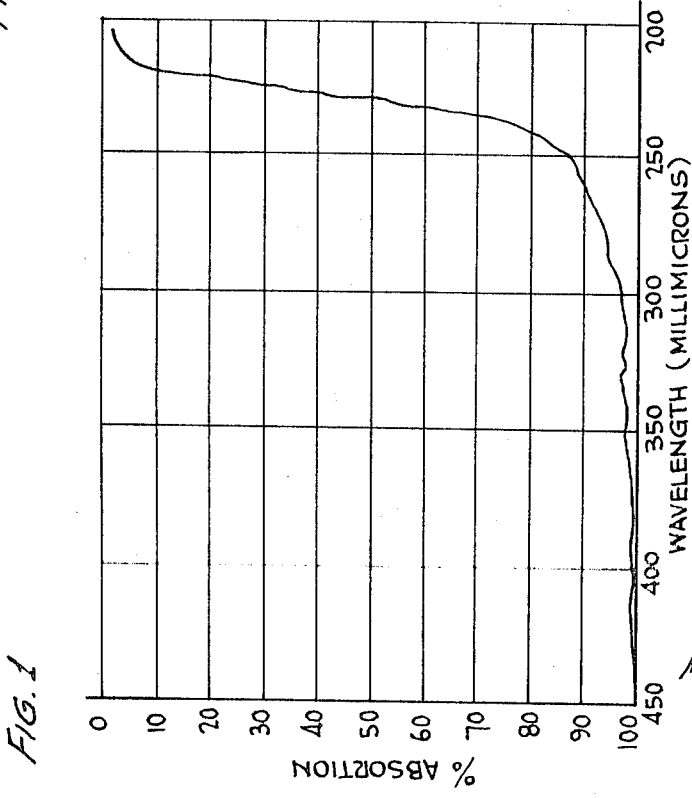
FIG. 1 illustrates the UV spectrum.

An inoculum broth is prepared having the following compositions:

|  | Percent |
|---|---|
| Soybean meal | 2.0 |
| Glucose | 2.0 |
| Ammonium sulphate | 0.3 |
| Sodium chloride | 0.25 |
| Calcium carbonate | 0.6 | pH 6.5 to 7.

The medium of 50 liters is sterilized at 15 lbs. for 30 minutes and inoculated when cooled to 28° C. with 48 hours vegetative growth of *Emericellopsis synnematicola* or *E. poonensis*. The inoculum to be used is previously grown in shake flasks and checked up under the microscope for vigorous growth. During the growth period in the 50 liter medium, there is aeration and agitation, the operations being carried out under sterile conditions. 0.5 volume of air per volume of culture broth per minute is used.

This inoculum after 48 hours growth is transferred to a fermentation tank with 1000 liters of medium with the following composition:

| | Percent |
|---|---|
| Soybean meal | 2.5 |
| Glucose | 3.0 |
| Ammonium sulphate | 0.5 |
| Sodium chloride | 0.25 |
| Calcium carbonate | 0.5 | pH 6.5 to 6.8.

The medium is sterilized by heating under pressure at about 120° C. for 30 minutes. The temperature is brought down to 28° C., and the inoculum of 50 liters from the seed vessel is transferred aseptically. During growth period the broth is stirred and sterile air is blown at the rate of 0.5 to one volume of air per volume of broth per minute. The growth of the mycelium and the antibiotic production is checked periodically by the gravimetric method. At the end of 96 to 120 hours, which is the usual period required, the pH of the broth is adjusted to 5 and filtered. The filtrate is collected and extracted with 1/3 volume of n-butanol using an extractor for thorough mixing and transfer of the antibiotic from the broth to the solvent. The mycelium also is similarly extracted first with 1.5 volumes of butanol per kilogram of the mycelium, and a second extraction using one liter of butanol per kilogram of the mycelium. After thorough extraction by agitation, the butanol is filtered and pooled. This is mixed with the butanol extraction of the broth filtrate. The pooled butanol extracts are given a water wash for removal of salts, etc., and then concentrated in vacuo to about 30 liters. The pooled butanol solution volume to start with is about 600 liters. Large amounts of slurry, which is the crude antibiotic, is thrown out. This is filtered, washed with acetone and dried. For the butanol solution after filtration of the slurry, 3 times the quantity of acetone is added, and the solution is kept chilled for 24 hours at 10° C. The creamy yellow precipitate is filtered, washed with acetone and dried.

The crude Antiamoebin thus obtained, is washed with several changes of water until no pale yellow coloring matter is given out, and dissolved in warm 45% methanol, maintained at 50° C. on water bath. Excess of Antiamoebin is added until it no longer dissolves. Activated charcoal (1% of methanolic extract) is added, and filtered while still warm. The solution is then kept at room temperature for 3 to 4 hours and then transferred to cold room and left at 50° C. overnight. Large masses of needle-shaped crystals are thrown out in bunches and these are filtered, washed with distilled water and dried. A second recrystallization may be carried out repeating the same process.

EXAMPLE 2

Fermentation process is carried out in the same manner. The mycelium which contains the major portion of the antibiotic is filtered by adjusting the pH of the broth to 5. The mycelium is washed, and extracted with methanol, using 1.5 liters of methanol per kilogram of mycelium for the first extraction, and one liter of methanol per kilogram of mycelium in the second extraction. The methanol is filtered and the extracts are pooled. The pooled extract is treated with activated charcoal (decolorizing) at the rate of 0.5%, and filtered. The extract then is evaporated in vacuo at temperature of 45 to 50° C. This is possible due to the presence of water in the methanolic extract. The volume of 600 liters of methanolic extract is brought down to 30 liters. Antiamoebin is thrown out as a white slurry, which is mostly crystalline. The crude crystals are filtered, washed with water and dried. The crude crystals are dissolved in 45% methanol or ethanol, treated with charcoal, filtered and re-crystallized by following the same procedure as given under Example 1.

The broth filtrate is treated with activated carbon (Norit SG) in proportion of 2 grams per liter of broth. The activated carbon is stirred, and filtered. The antibiotic is eluted using butanol, methanol or ethanol. The eluate is evaporated to dryness and Antiamoebin is purified by re-crystallization from this crude solid material.

EXAMPLE 3

Fermentation process is carried out in the manner described under Examples 1 and 2, and the mycelium is extracted with ethyl or methyl Cellosolve, and the extract concentrated to get the crude antibiotic. The crude antibiotic is processed further, and purified to obtain pure crystalline material.

EXAMPLE 4

Fermentation process carried out in the manner described under Examples 1 and 2, and the mycelium is extracted with aqueous acetone or dimethyl formamide, and the extract concentrated to give crude antibiotic, which is purified and crystallized.

EXAMPLE 5

Fermentation process is carried out in the manner described under Examples 1 and 2, and the mycelium is extracted in hot amyl alcohol or cyclohexanol, and the extract is concentrated to obtain the crude antibiotic.

The activity of the final product is determined by bioassay method for antiprotozoal activity, using *Tetrahymena pyriformis* and *Entamoeba histolytica*. The procedure for the bioassay using *Tetrahymena pyriformis* is as follows:

Cultures of *Tetrahymena pyriformis* maintained on soil-extract and peanut-meal decoction are prepared. Antiamoebin standard material is taken and an aqueous solution of 1 mg. per ml. is obtained. The antibiotic has to be solubilized first in a few drops of ethanol. Equal amounts of the Tetrahymena liquid culture containing $2 \times 10^4$ cells per ml. are taken in tubes, and by serial tube dilution method, concentration of the antibiotic is obtained from 1 μg. per ml. to 100 μg. per ml. in the range of 1–10–20–30–40 μg. ml. etc. After thorough mixing and incubation for one hour at 24° C., the solution in each tube is examined under the microscope. The concentration at which there is 100 percent lysis of the cells is determined. In the next series, dilutions between the concentration at which 100 percent lysis was observed, and the next lower concentration is taken, and the nearest concentration causing 100 percent lysis in 60 minutes is determined. For pure Antiamoebin, the concentration for lysis is at 46–48 μg. per ml.

In the case of *E. histolytica* (hyman), the usual strains found in the laboratory are used. The amoebae are grown in all-liquid Balamuth's medium and after an incubation time of 48 hours 37° C., the amobeae were harvested from the culture and mixed with fresh Balamuth's medium containing rice starch. The concentration of amoebae is adjusted in this process of dilution until approximately 5 motile amoebae were contained per 0.05 ml. Antiamoebin is dissolved in the same medium, after first being solubilized in a few drops of ethanol. The Balamuth's medium containing the trophozoites are distributed in tubes, and the antibiotic is added to obtain the requisite final concentration, and incuated at 37° C. for 48 hours, after which readings are taken by observation under a microscope for active trophozoites. Observation after 48 hours of incubation at 37° C. gave the following results:

Control (no antibiotic)—More than 25 motile throphozoites per field.
1/100 mg./ml.—Complete lysis, no amoebae
1/200 mg./ml.—Same
1/300 mg./ml.—Same
1/400 mg./ml.—Same
1/500 mg./ml.—Same $1/600$ to $1/900$ mg./ml.—Same. One or rarely two amoebae at $1/900$ mg./ml.

$1/1000$ mg./ml.—One or two active motile amoebae in 0.05 ml.

$1/2000$ mg./ml.—Growth rare, one or two amoebae per 0.05 ml.

$1/2500$ mg./ml.—2 to 5 amoebae per 0.05 ml.

$1/5000$ mg./ml.—More than 10 amoebae per 0.05 ml.

$1/10,000$ mg./ml.—More than 10 amoebae per 0.05 ml.

The amoebicidal activity of Antiamoebin is therefore between 0.5 to 1.25 µg./ml. The activity of unknown samples may be determined by the same procedure.

The antibiotic Antiamoebin can be used as a disinfectant against pathogenic amoebic trophozoites in a 2–4 µg./ml. in water. Such solutions can be used for washing premises suepected to harbon cyst and trophozoites. Other species of protozoa like Tetrahymena and paramoecium which thrive on floors on which water frequently stands can also be destroyed using a weak solution of the antibiotic. Tetrahymena species are inhibited at a concentration of about 40 µg./ml. in water and paramoecium species generally require a concentration of about 60 µg./ml. in water.

Cyclops are the intermediate hosts for the Guinea worm *Dracanculus medinensis* and pentration of the cyclops containing the larvae of the worm into the skin can cause infection. Cyclops are completely destroyed by aqueous Antiamoebin solutions containing a concentration of 20 µg./ml. ($1/50,000$). Washing of objects with which humans come in contact using the Antiamoebin solution effectively prevents such infection.

What is claimed is:

1. Antiamoebin which is a neutral polypeptide; has two crystalline forms one having a melting point of 192–195° C. when crystallized from methanol and acetone and the other a melting point of 218–220° C. when crystallized from aqueous methanol; has a pH of 5.0–7.0 as a 2% suspension in water; has an elemental analysis of carbon, 56.11%, hydrogen 7.56%, and nitrogen 13.56%; is dextro rotatory, $[\alpha]_D^{25}$ +10 (C., 1.02%, methanol), $[\alpha]_D^{25}$ +10 (C., 1.03%, dimethyl formamide); is soluble in methanol, ethanol, butanol, n-propanol, isopropanol, pyridine, glacial acetic acid, dimethyl formamide, aqueous acetone, moist methyl-ethyl ketone and methyl and ethyl Cellosolve; is insoluble in water, chloroform, ether, petroleum ether, ethyl acetate, butyl acetate, acetone, toluene, carbon tetrachloride, dioxane, benzene, carbon-disulphide, toluene, methyl chloride and ethylene glycol; gives negative results with Fehling's, Benedict's, Molisch's, and Sakaguchi tests; and exhibits characteristic absorption bands in the infrared region of the spectrum at the following frequencies: 3320–3290, 1650, 1530, 1078, and 695 cm.$^{-1}$.

2. A method for producing Antiamoebin which comprises cultivating at least one micro organism taken from the group consisting of *Emericellopsis synnematicola* (ATCC 16540), *E. poonensis* (ATCC 16411), and *Cephalosporium pimprina* (ATCC 16541) in a broth culture medium containing assimilable sources of carbohydrates, nitrogen and inorganic salts until the antibiotic is produced in the culture medium, and then recovering the antibiotic from the said culture medium.

3. A method according to claim 2, in which the culture medium is maintained at temperature range of about 20 to 37° C.

4. A method according to claim 3, in which the growth of the organism is carried out for a period from 2 to 8 days.

5. A method according to claim 2 wherein said cultivation is carried out under aerobic conditions for submerged culture.

6. A method according to claim 2 wherein said sources of carbohydrates in the broth culture medium are selected from the group consisting of glucose, sucrose, starch, dextrine, molasses and lactose; said sources of nitrogen are selected from the group consisting of corn-steep, soybean meal, peanut meal, legumes, distiller's mixtures, casein, amino acids, peptones, and inorganic nitrate and ammonium salts; and the sources of inorganic salts are selected from the group consisting of those inorganic salts capable of yielding ions of sodium, potassium, calcium phosphate chloride and sulphate.

7. A method according to claim 2 wherein the step of recovering the antibiotic from said culture medium comprises extracting said culture medium with water immiscible, polar organic solvents and aliphatic alcohols selected from the group consisting of methanol, ethanol, butanol, propanol, isopropanol, methyl Cellosolve, ethyl Cellosolve, aqueous acetone, pyridine and dimethyl formamide.

8. A method according to claim 2 wherein the step of recovering the antibiotic from said culture medium comprises absorbing the antibiotic from said culture medium using an absorbant selected from the group consisting of activated charcoal and magnesium aluminium silicate.

References Cited

Derwent Farmdoc #21,835, Abstracting South Africa Patent 65/5,730, published June 1, 1966.

JEROME D. GOLDBERG, Primary Examiner

U.S. Cl. X.R.

195—81